P. G. CHAMBERLAIN.
LINEAR COUNTER RULE.
APPLICATION FILED JUNE 5, 1919. RENEWED FEB. 28, 1920.
1,339,644.
Patented May 11, 1920.
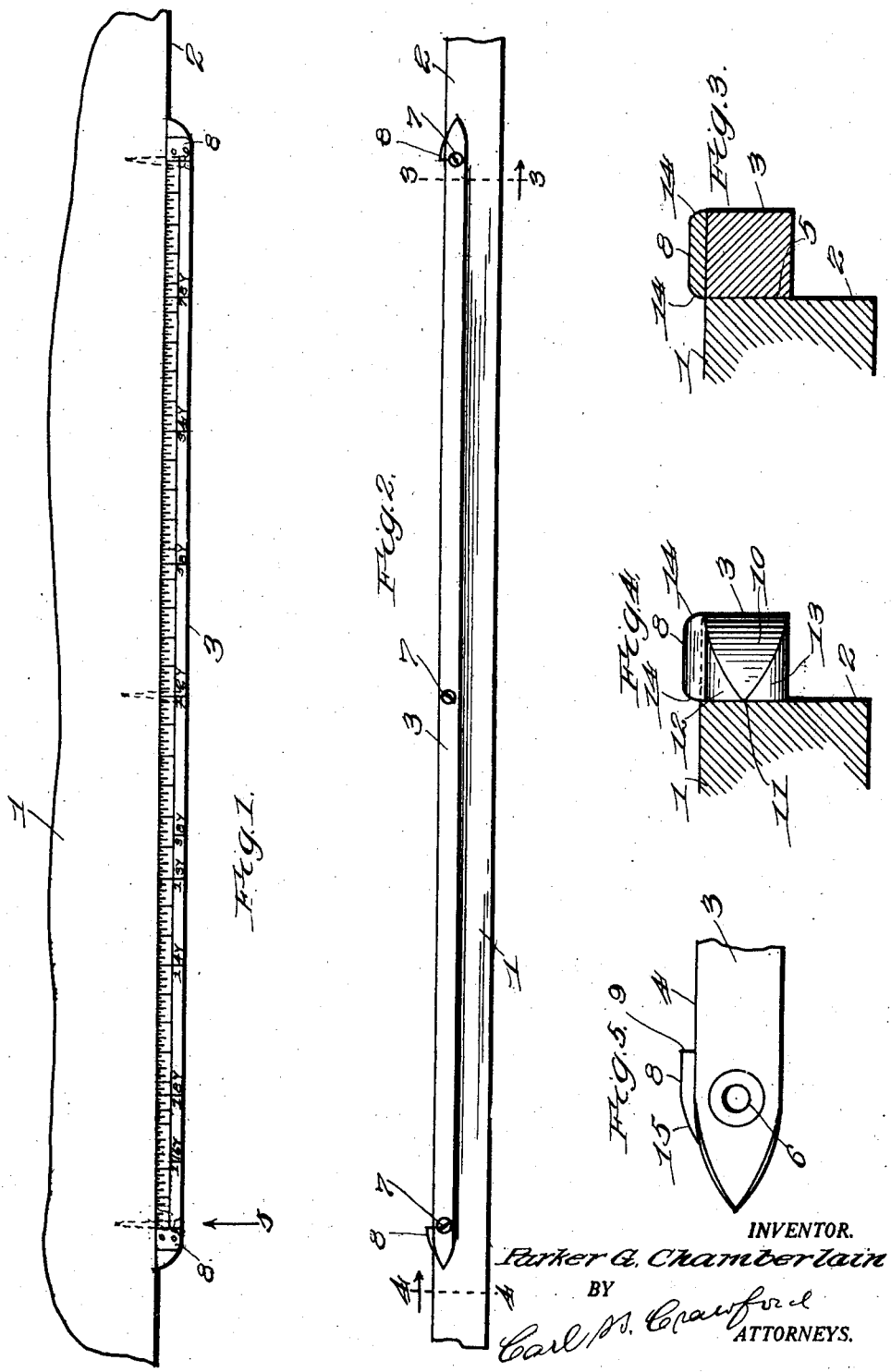
INVENTOR.
Parker G. Chamberlain
BY
Carl M. Crawford
ATTORNEYS.

UNITED STATES PATENT OFFICE.

PARKER G. CHAMBERLAIN, OF SPOKANE, WASHINGTON, ASSIGNOR OF ONE-HALF TO ALICE R. CHAMBERLAIN, OF SPOKANE, WASHINGTON.

LINEAR COUNTER-RULE.

1,339,644.  Specification of Letters Patent.  Patented May 11, 1920.

Application filed June 5, 1919, Serial No. 301,972. Renewed February 28, 1920. Serial No. 362,600.

*To all whom it may concern:*

Be it known that I, PARKER G. CHAMBERLAIN, a citizen of the United States, residing at Spokane, in the county of Spokane and State of Washington, have invented new and useful Improvements in Linear Counter-Rules, of which the following is a specification.

This invention relates to improvements in measuring devices and has to do more particularly with that class of devices which are used for measuring yards or fractions thereof in connection with drygoods and the like.

Until very recently, upon the introduction of some relatively expensive machines, it was the custom in drygoods and like stores to provide graduated surfaces on the salesman's edge of the counter by means of tacks located in spaced relation along the counter to indicate yards or fractions thereof. Portable yardsticks and tape measures were also used. However, in most of the States, such makeshift expedients have been legislated out of use as being lacking in accuracy, the laws requiring a definite measuring device.

It is the object of this invention to provide a measuring rule adapted to be attached to the sales side edge of a counter or table, one face of the rule being graduated to indicate a yard and fractions thereof, the improved rule being provided with abutments functioning to definitely indicate to the salesman either or both extreme terminals of the graduated portion, which in this case, is three feet, to avoid over-measure.

In a device of this character which necessarily projects from the surface or edge of the counter to which it is attached, certain objections have been offered because of the fact that such projections, especially at the ends of the rule, are apt to catch in the clothing of saleswomen, or in the goods manipulated while in the process of being measured.

Now it is a feature of this invention to provide a rule of this character with end portions of such a configuration as will eliminate the aforenamed objectionable feature.

In a rule where, as in this case, the abutments are fixed to the rule, it is a problem to provide a proper terminal end which will avoid the objections noted, and also provide room for the abutments, at the extreme terminals of the graduated portion, the construction being such that the terminals will not offer any endwise projecting portions, and the stock of the rule will not have to be unduly lengthened from the extreme ends of the graduated portions in order to at the same time provide enough stock to be rounded off and also accommodate the abutments. To this combination of features my invention is especially addressed.

In intimate coaction with the above feature, is a feature of my invention which consists in applying fastening means in such relation to those rounded-off portions as to cause the latter to snugly hug the attaching edge of the counter or table to which my improved rule may be secured.

Other features and objects of the invention will be more fully described in connection with the accompanying drawing and will be more particularly pointed out in and by the appended claims.

In the drawing:—

Figure 1, is a plan view of my improved rule secured to the inside or salesman's edge of a counter or table.

Fig. 2, is a view in edge elevation looking in the direction of arrow 5.

Fig. 3, is a sectional view on line 3—3 of Fig. 2, on an enlarged scale.

Fig. 4, is a sectional view on line 4—4 of Fig. 2.

Fig. 5, is a fragmentary end view looking in the direction of arrow 5 of Fig. 1.

Like characters of reference designate similar parts throughout the different figures of the drawing.

As illustrated, 1 designates a sales counter or table the inside edge, or the salesman's side of the table being designated at 2.

My improved linear counter rule is indicated at 3 and the same is shown rectangular in cross section. I prefer to make and have made the same of hard wood, of the full-size cross section shown in Fig. 3. As my improved rule is designated primarily for drygoods, although not so limited, I have provided the upper face 4 with graduations constituting a yard and subdivided into inches and fractions of a yard, as clearly indicated in Fig. 1. Therefore my improved rule has a graduated face 4, and also a face 5 which I will term the attaching face, which latter face is adapted to be secured in abutting relation against the edge 2 of the counter or table 1. It is a feature of my invention to secure the rule 3 to the counter in such a manner as to dispose the graduated face 4 flush with the top of the counter 1, as illustrated. To this end, the rule is provided with smooth screw holes 6, preferably countersunk, and as shown, three in number. Screws 7 are the means employed for anchoring the rule to the counter.

By means of this construction, the merchandise on the counter can readily be applied to the graduated surface 4 without lifting the goods and by merely advancing the goods toward the edge 2 of the counter. However, in this manner of measuring goods, what is termed in commerce as, "over-measure" is the most general result of such method. Over-measure in a large establishment constitutes, in the aggregate, a very considerable loss. Therefore it is one of the primary functions of my invention, without the use of operating mechanism, and by a simple expedient, to facilitate the rapid manipulation and measurement of dry goods in such a manner as to reduce the objectionable over-measure feature to a minimum. If the device of my invention is used with the minimum exercise of care, over-measure can be entirely eliminated.

At each extremity of the graduated portion of the rule I dispose an abutment, and as both abutments are the same only one need be described in detail, convenient reference being had to Fig. 5.

The abutment 8 is rigidly superimposed upon the graduated face 4 and it projects upwardly somewhat therefrom, Fig. 5 being full size. The abutment 8 has an abutment portion 9 which is accurately disposed at the precise graduation of the face 4. Thus the abutment portions are in facing relation and in measuring a number of yards of material, in sequence, yard after yard, the salesman can successively advance the material and by applying his fingernails or thumbnails upon the material to engage it against the abutment portions 9, each yard measured will be precisely a yard and no more and no less. If a fraction of a yard is to be measured, the end edge of the goods will be disposed upon and alined with the necessary graduated indication on the rule face 4 and the thumbnail of the salesman will be exerted to press the margin of the uncut portion against the abutment 9 at the left of the rule. Thus either in measuring a number of yards or fractions of a single yard the abutments will always come into play and proper function.

With a device of this character it is impossible to avoid projection of the rule beyond the inside edge 2 as the purpose of the device is to avoid the necessity of in any way modifying the counter or table to which it is applied. Therefore, with projection necessary, it was a problem to render such projection as unobjectionable as possible especially at the ends of the rule. If the ends of the rule were cut off square, these projecting ends would always be presenting an obstruction in which either the clothes of the salesman or saleslady or the goods itself might catch and be torn.

Furthermore, a simple device of this character does not command a large price and therefore it was a problem of this invention to reduce the amount of wood necessary both as regards the cost of the same, for quantity production, and the initial cost.

Therefore, the ends of the rule are rounded off and in the specific construction shown they are also tapered off. As will be clearly seen by reference to Fig. 4, the outer face 10 is rounded and tapered to an apex 11 which is flush with the inner face 5. The upper and lower faces are rounded off and tapered, as indicated at 12 and 13, to converge into the apex 11. Thus each end of the rule presents a surface which is so formed that it could not possibly amount to a projecting obstruction. A rule of this character, even when made of hard wood, has a certain amount of bending moment, and therefore it is a feature of my invention to dispose the end holes 6 as close to the terminal ends of the rule as possible so that in case of irregularity of the edge 2 of the counter, as compared to a plain surface, the end screws 7, or fastening means, can be so firmly applied that the apex end 11 will be snugly held against the edge 2 and the rule will bend sufficiently to conform to the counter edge 2.

In addition to providing a continuously smooth and unobstructing rule end, it is also necessary to employ abutments 8 which present no obstruction or goods catching portions except for their abutment portions 9. It is an advantage and it is a feature of my invention to extend the abutments 8 completely across the graduated face 4 so that if the salesman desires to observe the graduations, while measuring the goods, the abutment portions will have sufficient length to permit the goods to be pressed thereagainst even if a portion of the graduated face is exposed or not covered up with the goods. Thus it will be seen that these abutments 8 as shown in Figs. 3 and 4, extend clear across the top face of the rule, the edges 14 being suitably rounded off so as not to present an obstruction. The outer ends of the abutments 15 are tapered off to an edge and the taper is so formed that the outer ends of the abutments will merge into the top rounded surfaces 12 without forming any obstruction. Thus it was a problem to get sufficient height for the abutments 8 and to provide space for their mounting upon the rule without unduly or excessively extending the length of the rule beyond the endmost or terminal graduation thereof, in combination with such a rounded off portion of the rule end as not to form an obstruction.

My invention resides in the rule as an article of manufacture, and also in the rule in combination with a counter or table.

While I have herein shown and described one specific form of my invention I do not wish to be limited thereto except for such limitations as the claims may import.

I claim:—

1. In a linear counter rule device for measuring drygoods or like flexible material, the combination with a counter or table having a side edge, an elongated rule of rectangular cross section having an attaching and a graduated face, means for securing said rule to the counter with its attaching face against the edge of the counter and its graduated face uppermost and flush with the top of the counter, the ends of said rule being rounded off and converging at their rounded-off terminals to apices flush with the attaching face to thereby present on the upper, outer and lower face rounded end portions, and measuring abutments fixed on said upper face and each abutment having an abutment portion projecting upwardly from said graduated face and said portions of said abutments facing each other and being exactly at the extreme terminals of the graduations, said abutments extending transversely of the rule completely across the graduated face thereof and the end portions of said abutments being tapered off.

2. In a linear counter rule device for measuring drygoods or like flexible material, the combination with a counter or table having an attaching edge, an elongated rule having an attaching and a graduated face, means for securing said rule to the counter with its attaching face against the attaching edge of said counter and its graduated face uppermost and substantially flush with the top of the counter, the ends of said rule being rounded off toward said attaching face, and measuring abutments fixed on said upper face and each abutment having an abutment portion projecting upwardly from said graduated face and said portions facing each other and being exactly at the extreme terminals of the graduations, said abutment portions extending transversely of the rule completely across the graduated face thereof and the end portions of said abutments being tapered off and merging flush into the rounded-off ends of said rule.

3. A linear rule device for attachment to the edge of a counter in projecting parallel relation to the edge to which it is attached, the upper face of said rule being graduated and the end portions of said rule being rounded off toward that edge of the rule which is adapted to be attached to the counter to eliminate projecting flat arresting portions at the ends of the rule, the rule ends being rounded off as closely as possible to the terminals of the graduated portion, and abutments on said rule having abutment portions projecting upwardly from the graduated face precisely at the extreme end terminals of the graduations and the remainder of said abutments extending toward said rounded ends and being tapered off and merging flush into said rounded ends.

In testimony that I claim the foregoing as my own, I hereby affix my signature.

PARKER G. CHAMBERLAIN.